(12) United States Patent
Gilbert et al.

(10) Patent No.: US 7,176,784 B2
(45) Date of Patent: Feb. 13, 2007

(54) MULTI-MODE RADIO FREQUENCY DEVICE

(75) Inventors: Ronald W. Gilbert, Morgan Hill, CA (US); Curtis Lee Carrender, Morgan Hill, CA (US); Gordon A. Anderson, Benton City, WA (US); Kerry D. Steele, Kennewick, WA (US)

(73) Assignee: Battelle Memorial Institute K1-53, Richland, WA (US)

( * ) Notice: Subject to any disclaimer, the term of this patent is extended or adjusted under 35 U.S.C. 154(b) by 177 days.

(21) Appl. No.: 10/762,585

(22) Filed: Jan. 21, 2004

(65) Prior Publication Data

US 2005/0156709 A1 Jul. 21, 2005

(51) Int. Cl.
*H04Q 5/22* (2006.01)
(52) U.S. Cl. .................. 340/10.34; 340/5.1; 340/572.4
(58) Field of Classification Search ............. 340/10.34, 340/10.1, 3, 10.2, 5.1, 5.61, 5.31, 10.4, 5, 340/61, 10.6, 572.4, 572.2; 307/10.2, 104; 235/492, 494, 380; 365/229; 342/386
See application file for complete search history.

(56) References Cited

U.S. PATENT DOCUMENTS

| | | | |
|---|---|---|---|
| 5,317,309 A * | 5/1994 | Vercellotti et al. ......... | 340/10.5 |
| 5,418,358 A | 5/1995 | Bruhnke et al. ............ | 235/492 |
| 6,011,320 A * | 1/2000 | Miyamoto et al. ......... | 307/10.2 |
| 6,236,333 B1 * | 5/2001 | King ......................... | 340/5.61 |
| 6,462,647 B1 * | 10/2002 | Roz ........................... | 340/10.1 |
| 6,473,028 B1 | 10/2002 | Luc ............................ | 342/118 |
| 6,489,883 B1 * | 12/2002 | Iiyama et al. ............... | 340/5.1 |
| 2003/0095033 A1 | 5/2003 | Amtmann ................... | 340/10.1 |
| 2003/0162496 A1 | 8/2003 | Liu ............................ | 455/11.1 |

FOREIGN PATENT DOCUMENTS

| | | | |
|---|---|---|---|
| GB | 2292866 A | * | 3/1996 |
| WO | WO 03/041009 A1 | | 5/2003 |
| WO | WO 2004/006164 A1 | | 1/2004 |

* cited by examiner

*Primary Examiner*—Wendy R. Garber
*Assistant Examiner*—William Bangachon
(74) *Attorney, Agent, or Firm*—Seed IP Law Group PLLC

(57) ABSTRACT

A transponder device having multiple modes of operation, such as an active mode and a passive mode, wherein the modes of operation are selected in response to the strength of a received radio frequency signal. A communication system is also provided having a transceiver configured to transmit a radio frequency signal and to receive a responsive signal, and a transponder configured to operate in a plurality of modes and to activate modes of operation in response to the radio frequency signal. Ideally, each mode of operation is activated and deactivated independent of the other modes, although two or more modes may be concurrently operational.

19 Claims, 3 Drawing Sheets

MULTI-MODE RADIO FREQUENCY DEVICE

STATEMENT REGARDING FEDERALLY SPONSORED RESEARCH OR DEVELOPMENT

This invention was made with U.S. Government support under Contract DE-AC06-76RL01830 awarded by the U.S. Department of Energy. The U.S. Government has certain rights in the invention.

BACKGROUND OF THE INVENTION

1. Field of the Invention

The present invention pertains to radio frequency identification devices and, more particularly, to a radio frequency tag configured to operate in multiple modes for increased range and capability with more efficient use of power.

2. Description of the Related Art

Radio frequency identification (RFID) devices are utilized in systems that include an interrogator for transmitting interrogation signals and receiving responsive signals therefrom, and transponders that receive the interrogation signals and generate the responsive signals. In most systems, the transponders, known as "tags," are either powered by a battery for active transmission or are powered by the interrogation signal for passive backscattering of a modulated signal. Semi-active tags typically operate in a passive mode but they have the ability to utilize stored energy to modulate the received signal.

The beam-powered RF tag is often referred to as a passive device because it derives the energy needed for its operation from the interrogation signal beamed at it. The tag rectifies the field and changes the reflective characteristics of the tag itself, creating a change in reflectivity that is seen at the interrogator. A battery-powered semi-passive RFID tag operates in a similar fashion, modulating battery-powered semi-passive RFID tag operates in a similar fashion, modulating its RF cross-section in order to reflect a delta to the interrogator to develop a communication link. Here, the battery is the source of the tag's operational power. Finally, in the active RF tag, a transmitter is used to generate its own radio frequency energy powered by the battery.

Referring to FIG. 1, a typical RF tag system will include an interrogator 12 and one or more RF tags 14. The range of communication for such tags 14 varies according to the transmission power of the interrogator 12 and the type of RF tag 14 used in the system 10. Battery-powered tags operating at 2,450 MHz have traditionally been limited to less than 10 meters in range. However, devices with sufficient power can reach up to 200 meters in range, depending on the frequency and environmental characteristics.

Conventional continuous wave backscatter RF tag systems utilizing passive RF tags require adequate power from the interrogation signal 20 to power the internal circuitry in the RF tag 14 that is used to amplitude-modulate the response signal 22 back to the interrogator 12. While this is successful for tags that are located in close proximity to the interrogator 12, for example less than 3 meters, this may be insufficient range for some applications, for example, which require greater than 100 meters.

Because passive RF tags 14 require the use of power directly from the interrogation signal 20, obtaining sufficient power to operate the tags 14 with enough sophistication to modify memory, monitor inputs, and control outputs dictates that the tags 14 be in close proximity (typically less than 1 meter) to the interrogator 12. It would be desirable to have a tag that can be detected at further distances so it can be located and identified, whereupon one could move closer to the tag in order to activate more complex functions in the tag. Conventional tags are either very close-range tags with sophisticated circuitry that requires substantial power or longer range tags that are very simple tags capable of only indicating their presence in an RF field.

BRIEF SUMMARY OF THE INVENTION

In accordance with one embodiment of the invention, a radio frequency identification communication device is provided in the form of an RFID tag configured to operate in a first mode when at a first distance from a radio frequency signal source, to operate in a second mode when at a second distance that is closer to the radio frequency signal source than the first distance, and to operate in third mode when at a third distance that is closer to the radio frequency signal source than the second distance. Ideally, the tag is configured to operate in a plurality of modes and to change modes of operation in accordance with the strength of a received radio frequency signal, which is inversely proportional to the distance of the tag from the radio frequency signal source.

In accordance with another embodiment of the invention, a radio frequency identification tag is configured to operate in a passive mode for backscatter operations and to operate in an active mode for transmission of a radio frequency signal, the mode of operation selected in response to a received radio frequency interrogation signal, and ideally in response to the strength of the received interrogation signal.

In accordance with a further embodiment of the invention, a multiple-mode radio frequency tag is provided that incorporates several distinct modes in a single radio frequency tag architecture. A micro-power oscillator in the tag obtains sufficient power from a received signal to oscillate and thus be detectable by a reader at great distances. As the tag is brought closer to the reader, a ROM-based circuit or other similar circuit obtains sufficient power to disable the oscillator and modulate an identification code that is preprogrammed into its memory. As the tag is moved closer still, a CMOS microcontroller will receive enough power to disable the other modes of operation and enable the tag to perform tasks such as read and write operations, monitoring of external inputs, and controlling external outputs. The distances at which the modes change will depend on a number of parameters, such as interrogator power, antenna gain, tag size, etc.

As will be readily appreciated from the foregoing, a radio frequency tag having these features will be useful in many applications. Items can be "detected" at great distances. Once the distance is shortened, items can be uniquely identified, and at an even closer distance the contents of the tag can be changed, high-speed communication can commence, and control of external inputs and outputs will be available.

BRIEF DESCRIPTION OF THE SEVERAL VIEWS OF THE DRAWING(S)

DETAILED DESCRIPTION OF THE INVENTION

The disclosed embodiments of the invention are directed to radio frequency communication between a transceiver and a transponder that facilitates reading of the transponder in multiple modes of operation, including an active transmission mode, a passive backscatter mode, and a semi-passive backscatter mode. It is known that an active tag contains five major portions, which are memory, logic, modulation control, transmitter, and battery. Typically, it is the transmitter that consumes the majority of battery energy.

In one embodiment of the invention, modulation control is enabled for an additional portion of the tag, in this case, a passive circuit. Thus, a passive circuit and an active circuit share portions of the same modulation function. However, the passive portion is now enabled much more often or even permanently for the backscatter mode of operation. As such, the tag can be read at a short range when in a backscatter mode with little or no drain on battery life. The actual transmitter mode of the transponder is only enabled for actual long-range transmissions.

Figure 1:
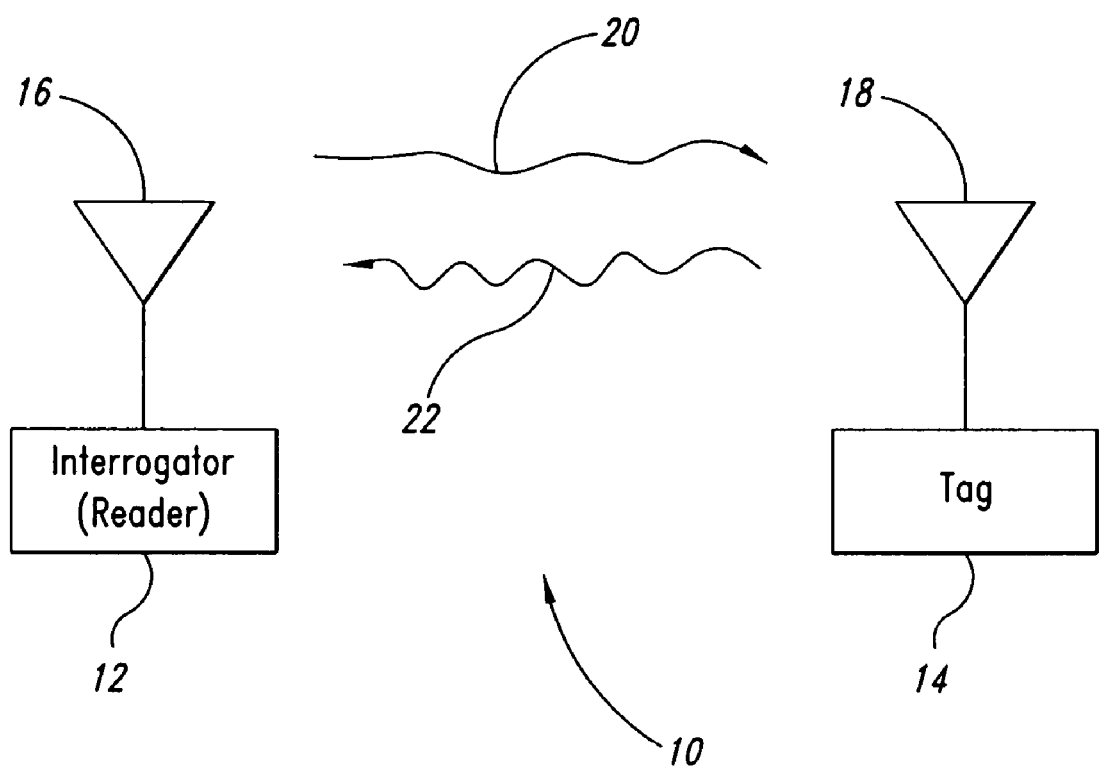
FIG. 1 is a diagram of a conventional radio frequency tag system.
Figure 2:
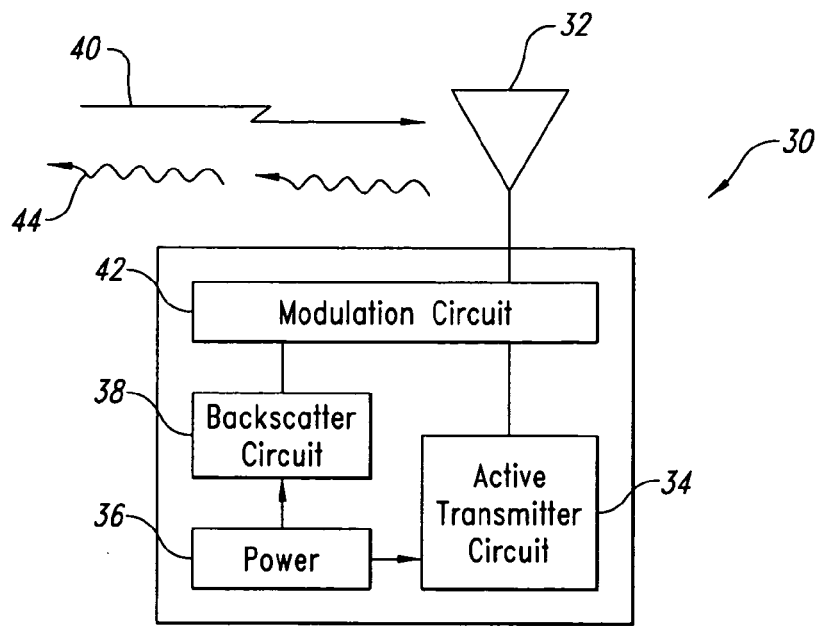
FIG. 2 is a diagram of an active transponder with a backscatter modulation backup circuit.

Turning to FIG. 2, shown therein is a transponder 30 having an antenna 32 coupled to an active transmitter circuit 34 that is powered by a power source 36. The transponder 30 also includes a backscatter circuit 38 powered by the power source 36. The active transmitter circuit 34 and the backscatter circuit 38 share the antenna 32, and as such these circuits may operate alone or in conjunction with each other. In response to an interrogation signal 40, both the backscatter circuit 38 and the active transmitter circuit 34 share the modulation circuit 42 to generate a responsive signal 44. The power source 36 can be a conventional battery or other charge storage device that provides sufficient power to operate both the active transmitter circuit 34 and the backscatter circuit 38 in alternative modes of operation, i.e., backscatter mode or active transmitter mode or both. The mode of operation can be controlled by the interrogation signal, by an outside input such as an environmental condition, by a preprogrammed control system in the transponder 30, or other known method for mode selection.

Figure 3:
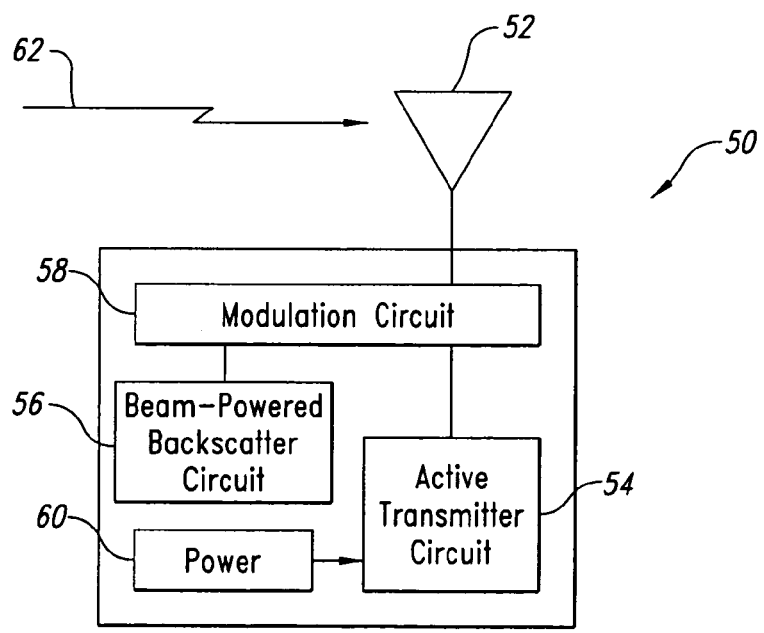
FIG. 3 is a diagram of an active transponder with a beam-powered backup backscatter circuit.

FIG. 3 illustrates a transponder 50 having an antenna 52 coupled to an active transmitter circuit 54 and a beam-powered backscatter circuit 56, which share portions of a modulation circuit 58. Here, a power source 60 provides power only to the active transmitter circuit 54. The beam-powered backscatter circuit 56 receives operational energy from the interrogation signal 62.

As can be seen in FIG. 3, the passive backscatter circuit 56 and the active transmitter circuit 54 share portions of the same modulation function, but the passive backscatter circuit 56 can be enabled more frequently, or even permanently for short-range communication in a backscatter mode with little or no drain on battery lifetime. The active transmitter circuit 54 need only be enabled for actual long-range transmissions or in a "tag talk first" situation, such as signaling an alarm condition, etc.

Figure 4:
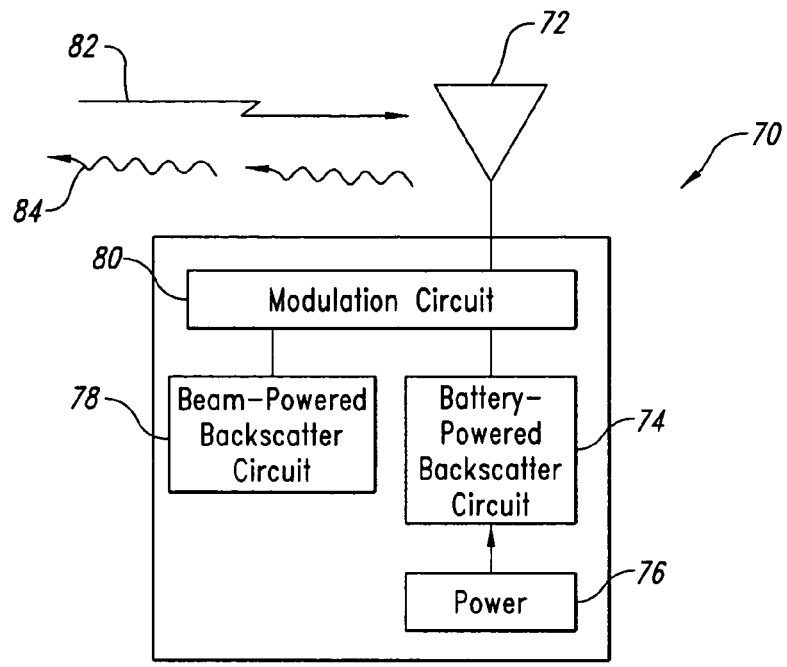
FIG. 4 is a diagram of a semi-active battery-powered backscatter transponder device with a beam-powered backup backscatter modulation circuit.

FIG. 4 illustrates a transponder 70 wherein the antenna 72 is coupled to a battery-powered backscatter circuit 74 that in turn is coupled to a power source 76. The antenna 72 is further coupled to a beam-powered backscatter circuit 78, which shares portions of a modulation circuit 80 with a battery-powered backscatter circuit 74. Here, operation of either the beam-powered backscatter circuit 78 or the battery-powered backscatter circuit 74 may be initiated in response to an interrogation signal 82, although other methods of determining or selecting modes of operation can be used as discussed above, and these two circuits return a backscatter-modulated signal 84.

Figure 5:
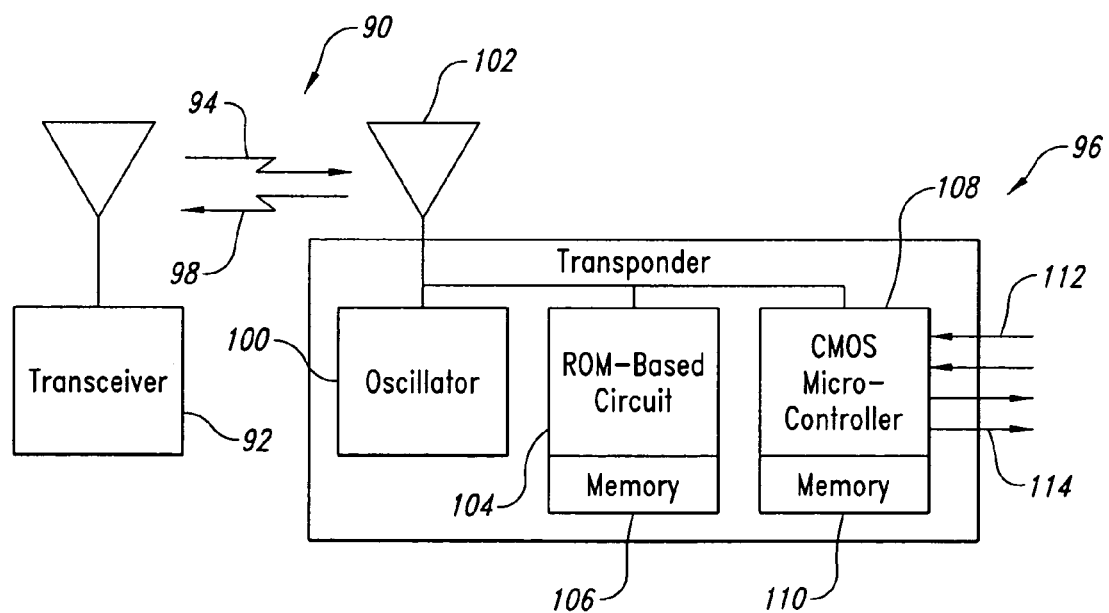
FIG. 5 is a schematic of a communication system formed in accordance with the present invention.

FIG. 5 illustrates yet another embodiment of the invention in the form of a communication system 90 having a transceiver 92 configured to transmit an interrogation signal 94 and a transponder 96 configured to return or transmit a second signal 98. In this embodiment, the transponder 96 includes an oscillator circuit 100 coupled to an antenna 102 in conjunction with a ROM-based circuit 104 having a memory 106, and further in conjunction with a CMOS microcontroller 108 having an associated memory 110. This transponder 96 is capable of operating in at least three distinct modes of operation and more modes of combined operations, all of which are powered from the interrogation signal 94 generated by the transceiver 92.

Thus, the oscillator 100 is preferably a micro-power oscillator that will obtain sufficient power to oscillate and thus be detectable by the transceiver 92 at great distances. As the transponder 96 is brought closer to the transceiver 92, the ROM-based circuit 104 is configured to obtain sufficient power at a second distance that is closer to the transceiver than the first distance to modulate an identification code pre-programmed into its memory. Preferably, the ROM-based circuit 104 deactivates the oscillator 100 so that the modes operate individually and distinct from each other. As the distance between the transponder 96 and the transceiver 92 is shorter than the second distance described above, the CMOS microcontroller 108 will receive sufficient power to enable the transponder 96 to perform tasks such as read/write operations, monitoring of external inputs, and control of external outputs. Preferably the microcontroller 108 will have sufficient power to disable the ROM-based circuit 104 to provide a distinct mode of operation of the microcontroller 108 only.

It is to be understood that all mode change distances are dependent on many parameters, such as transceiver signal power, antenna gain, transponder size, and the like.

Other modes of operation are also possible, such as a combination of the oscillator 100 and the ROM-based circuit 104 operating in conjunction with each other while the CMOS microcontroller 108 is deactivated. Further combinations include concurrent operation of the oscillator 100 and the CMOS microcontroller 108, or the ROM-based circuit 104 and the CMOS microcontroller 108, or all three, i.e., the oscillator 100, the ROM-based circuit 104, and the CMOS microcontroller 108 all operating at the same time. While it is possible that one or more of these circuits can be powered by a stored charge in the transponder 96, such is not preferred in order to limit the size, weight, and cost of the transponder 96.

In the embodiment of FIG. 5, a radio frequency tag incorporating this design would have many novel applications. For example, items can be "detected" at great distances. Once the distance is reduced, such as the transceiver 92 moving closer to the transponder 96 or vice versa, items can be uniquely identified. A closer range of operation enables changing of the contents of a memory in the transponder 96, high-speed communications, and control of external inputs and outputs. Thus, the transponder 96 could include one or more inputs, one or more outputs, or both to one or more of the oscillator 100, ROM-based circuit 104, and CMOS microcontroller 108 to accomplish the foregoing. For example, the microcontroller 108 can have input lines 112 and output lines 114 configured for external connection via conventional methods or hardware to communicate with external devices.

In all of the embodiments, the mode of operation can be selected in response to the strength of the interrogation signal. In other words, as the distance between the source of the interrogation signal and the transponder is decreased, the strength of the signal will increase, resulting in a change of mode of operation. Alternatively, the strength of the signal transmitted by a transceiver or reader could be varied without changing the distance, and the varied signal strength will change the mode of operation. In a preferred configuration, the transponder operates in a plurality of modes and the modes of operation are activated in response to only the strength of the received interrogation or radio frequency signal. As such, each mode of operation is activated and deactivated independent of the other modes of operation in response to the strength of the received signal. However, while the transponder can be configured to deactivate all modes that are not operational, or to activate only one mode of operation at a time, other control schemes can be employed. For example, automatic or selective operation of two or more of the modes of operation can be accomplished wherein the return signal has multiple levels or frequencies of data incorporated in it, or multiple different signals can be sent, either through the single antenna or through individual antennas coupled to the individual circuits.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A transponder device, comprising:
a radio frequency identification transponder having at least an oscillator circuit and a microcontroller and configured to operate in at least one of a plurality of modes of operation and to change modes of operation in accordance with the strength of a received radio frequency signal, the modes of operation comprising at least two of a first mode in which the oscillator circuit operates and the microcontroller does not operate in response to a first strength of the received radio signal, a second mode in which the oscillator circuit and the microcontroller both operate in response to a second strength of the received radio signal, and a third mode in which neither the oscillator circuit nor the microcontroller operate in response to a third strength of the received radio frequency signal.

2. The transponder device of claim 1, wherein each mode of operation is activated and deactivated independent of the other modes of operation in response to the strength of the radio frequency signal.

3. The transponder device of claim 1, wherein the transponder is configured to operate in a passive state when within a first distance from the transceiver, and in an active state when within a second distance from the transceiver that is closer to the transceiver than the first distance.

4. The transponder device of claim 1, wherein the transponder is configured to deactivate all modes that are not operational.

5. The transponder device of claim 1, wherein the transponder is configured to activate only one mode of operation at a time.

6. A transponder device for operation in conjunction with a radio frequency signal source, comprising:
a radio frequency identification tag configured to operate in a first mode when at a first distance from the radio frequency signal source, to operate in a second mode when at a second distance that is closer to the radio frequency signal source than the first distance, and in a third mode when at a third distance that is closer to the radio frequency signal source than the second distance, the first, second, and third modes selected in response to receipt of the radio frequency signal transmitted from the radio frequency signal source, the tag configured to operate in the first mode in which an oscillator circuit operates in response to a first strength of the radio frequency signal a ROM-based circuit and a microcontroller circuit do not operate, in the second mode in which the oscillator and the ROM-based circuit operate and the microcontroller circuit does not operate in response to a second strength of the radio frequency signal, and in the third mode in which the oscillator, the ROM-based circuit, and a microcontroller circuit operate in response to a third strength of the radio frequency signal.

7. The transponder device of claim 6, wherein the mode is selected in response to the strength of the transmitted radio frequency signal.

8. The transponder device of claim 6, wherein the tag is configured to deactivate all modes that are not operational.

9. A radio frequency transponder architecture, comprising:
a micro-power oscillator configured to obtain sufficient power from a received radio frequency signal to oscillate and be detectable at a first distance, a ROM-based circuit that obtains sufficient power from the received radio frequency signal at a second distance that is shorter than a first distance to the source of the radio frequency signal to modulate an identification code preprogrammed in a memory of the ROM-based circuit, and a CMOS microcontroller configured to receive sufficient power from the received radio frequency signal at a third distance that is shorter than the second distance to the source of the radio frequency signal, the architecture structured to perform at a plurality of modes of operation comprising a first mode of read operations, a second mode of write operations, a third mode of monitoring of external inputs, and a fourth mode of generating control signals for controlling external devices and the architecture further structured so that in one of the first, second, third and fourth modes of operation the oscillator operates and the ROM-based circuit and CMOS microcontroller do not operate, and in another of the first, second, third, and fourth modes of operation the oscillator and the ROM-based circuit operate and the CMOS controller does not operate, and in a further of the first, second, third, and fourth modes the oscillator, the ROM-based circuit and the CMOS microcontroller all operate.

10. The architecture of claim 9, wherein each mode of operation is activated and deactivated independent of the other modes of operation in response to the strength of the radio frequency signal.

11. The architecture of claim 9, wherein the transponder is configured to deactivate all modes that are not operational.

12. The architecture of claim 9, wherein the transponder is configured to activate only one mode of operation at a time.

13. A communication system, comprising:
  a transceiver configured to transmit a radio frequency signal and to receive a response signal; and
  a transponder configured to operate in a plurality of modes and to activate modes of operation in response to only the strength of the radio frequency signal, the transponder comprising a radio frequency identification tag configured to operate in a first mode when at a first distance from the transceiver, to operate in a second mode when at a second distance that is closer to the transceiver than the first distance, and in a third mode when at a third distance that is closer to the transceiver than the second distance, the first, second, and third modes selected in response to receipt of the radio frequency signal transmitted from the transceiver, the tag configured to operate in the first mode in which an oscillator circuit operates in response to a first strength of the received signal, in the second mode in which the oscillator and a ROM-based circuit operatesoperate in response to a second strength of the received signal, and in the third mode in which the oscillator, the ROM-based circuit and a microcontroller circuit operate in response to a third strength of the received signal.

14. The system of claim 13, wherein the transceiver is configured to vary the strength of the transmitted radio frequency signal.

15. The system of claim 13, wherein each mode of operation is activated and deactivated independent of the other modes of operation in response to the strength of the radio frequency signal.

16. The system of claim 13, wherein the transponder is configured to operate in a passive mode when within the first distance from the transceiver, and in an active mode when within the second distance from the transceiver that is closer to the transceiver than the first distance.

17. The system of claim 13, wherein the transponder is configured to deactivate all modes that are not operational.

18. The system of claim 13, wherein the transponder is configured to activate only one mode of operation at a time.

19. The system of claim 13, wherein the microcontroller circuit has at least one input and at least one output for communication with external devices.

* * * * *